United States Patent [19]  
King

[11] 3,884,608  
[45] May 20, 1975

[54] INJECTION MOLDING MACHINE WITH SHOT SIZE REGULATION

[75] Inventor: Earl H. King, Cygnet, Ohio

[73] Assignee: Sund-Borg Machines Corporation, Fremont, Ohio

[22] Filed: Mar. 1, 1973

[21] Appl. No.: 337,092

Related U.S. Application Data

[63] Continuation of Ser. No. 116,789, Feb. 19, 1971, abandoned.

[52] U.S. Cl. ............... 425/145; 425/246; 425/244
[51] Int. Cl. ............................................. B29f 1/04
[58] Field of Search ........... 425/145, 147, 244, 245, 425/166, 246

[56] References Cited
UNITED STATES PATENTS

| | | | |
|---|---|---|---|
| 2,734,226 | 2/1956 | Willert | 425/166 X |
| 3,314,112 | 4/1967 | Hardcastle | 425/246 X |
| 3,530,536 | 9/1970 | Thorman et al. | 425/168 X |
| 3,538,548 | 11/1970 | Tenner | 425/146 X |
| 3,574,894 | 4/1971 | Aoki | 425/246 |
| 3,611,480 | 10/1971 | Zippel et al. | 425/166 |
| 3,647,309 | 3/1972 | Thompson | 425/145 X |
| 3,674,401 | 7/1972 | Annis | 425/244 |
| 3,741,699 | 6/1973 | Arpajian et al. | 425/145 |

Primary Examiner—Francis S. Husar
Assistant Examiner—David S. Safran
Attorney, Agent, or Firm—Watts, Hoffman, Fisher & Heinke

[57] ABSTRACT

In an injection molding machine, the molten plastic is passed from the plasticator unit to a rotary valve initially adjusted to divert the plastic into an injection accumulator chamber. The injection ram is pushed upward in the injection accumulator chamber by the entrance of molten plastic into that chamber. The ram position is sensed to provide a signal which indicates the ram position, and thus also signifies the volume of plastic accumulated - also termed the "shot size." When this volume reaches a preset amount, the rotary valve is turned and the injection cylinder actuated to displace the ram, driving the volume of the precisely measured plastic into the mold. A control circuit is provided for accurately comparing the position signal, indicating the ram displacement, with a reference signal preset to indicate the desired "shot size". The output signal from the control circuit is utilized to indicate when the precise shot size has been accumulated, and terminate ram movement at that point.

10 Claims, 3 Drawing Figures

Inventor
Earl H. King

INJECTION MOLDING MACHINE WITH SHOT SIZE REGULATION

CROSS REFERENCE TO RELATED APPLICATION

This application is a continuation of application Ser. No. 116,789, filed Feb. 19, 1971, now abandoned.

BACKGROUND OF THE INVENTION

Different types of molding machines have been utilized with injection techniques for providing plastic articles. A mold is first fed into the work station, adjacent the plasticator unit which receives the solid plastic and converts it into a molten or foamed state. The molten plastic from the plasticator unit is passed through a valve, into an accumulator chamber and the ram is pushed upward in that chamber. The valve is turned and the ram displaced to drive the molten plastic into the mold. The first mold is then moved to the next station, as an empty mold is concomitantly displaced into the filling or work station. After the sequence of operations, the formed plastic units are unloaded at another station, and the cycle is repeated.

In a large rotary machine where the molds are successively placed on a work table adjacent the plasticizer, it may be that different amounts of molten plastic are to be injected into differently sized molds. For example, one mold may require a small shot, such as ten ounces, and the next mold may be large, requiring a shot of forty pounds. With known equipment it has not been possible to preset the precise amount to be injected, from a central control station, and still achieve a high degree of accuracy for differently sized shots and molds. In addition it has not been possible to provide such variable plastic amounts with close control, and assure repeatability with successive operations.

It is therefore a primary consideration of the present invention to provide such an injection molding machine which includes means for presetting and closely regulating the amount of molten or foam plastic to be injected into each successive mold, and for varying the shot amounts for successive molds.

A corollary object of this invention is to provide such a system which accurately regulates the volume of plastic injection with a high degree of repeatability in successive operations.

SUMMARY OF THE INVENTION

The present invention is useful with an injection molding machine which has means for delivering plastic, whether molten or foamed. An injection assembly in the machine includes a movable member such as a ram which is displaceable in a first direction to accumulate the plastic in an accumulator chamber. Thereafter the ram is displaceable in the opposite direction, to inject the accumulated plastic through an output channel and into the mold.

Particularly in accordance with the present invention, a control system is provided to regulate the volume or shot size of the plastic accumulated. The control system includes a first adjustable unit, such as a potentiometer, for presetting a reference signal indicating the desired shot size. A second adjustable unit, which can also be a potentiometer, is connected to provide a position signal which varies as a function of the physical position of the ram. A comparator means, such as an integrated circuit or other electronic comparison circuit, is coupled both to the first and second adjustable units. The comparator means provides a control signal when it "recognizes" equality between the reference signal, denoting desired shot size, and the position signal, which indicates the actual volume of the plastic accumulated. A switching means, which may include a line for passing a pressure signal from the plasticizer unit to the injection assembly, is provided. This switching means operates to halt the ram when the desired shot size has been accumulated, thus insuring the injection of exactly the precise amount of plastic indicated by the setting of the first adjustable unit.

In the several figures of the drawings, like reference numerals identify like components, and in those drawings.

GENERAL BACKGROUND DESCRIPTION

Figure 1:
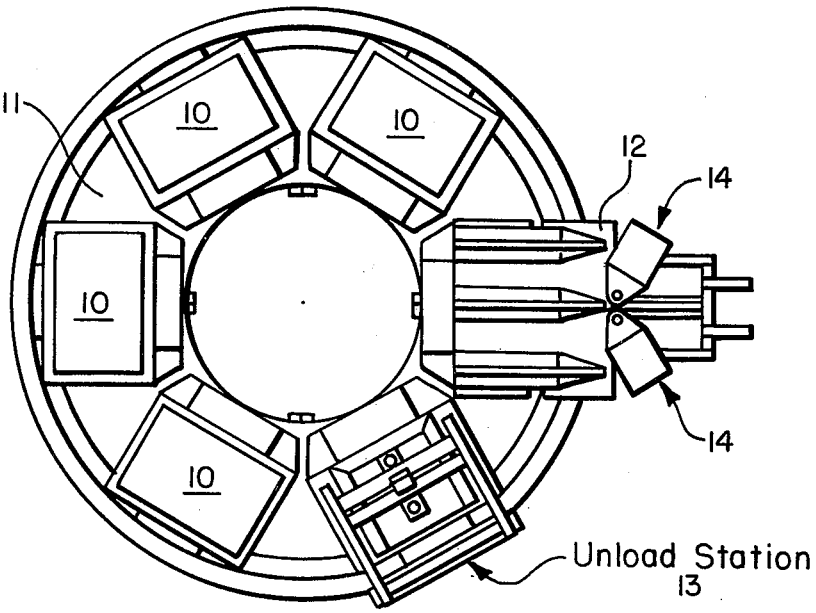
FIG. 1 is a plan view of a rotary injection molding machine.

FIG. 1 shows a plurality of molds 10 arranged for counterclockwise displacement around a track 11 between a work position over table 12 and an unload station designated 13. A pair of plasticator units 14 are provided to melt and/or foam the plastic material for passage to the mold then on work table 12.

Figure 2:
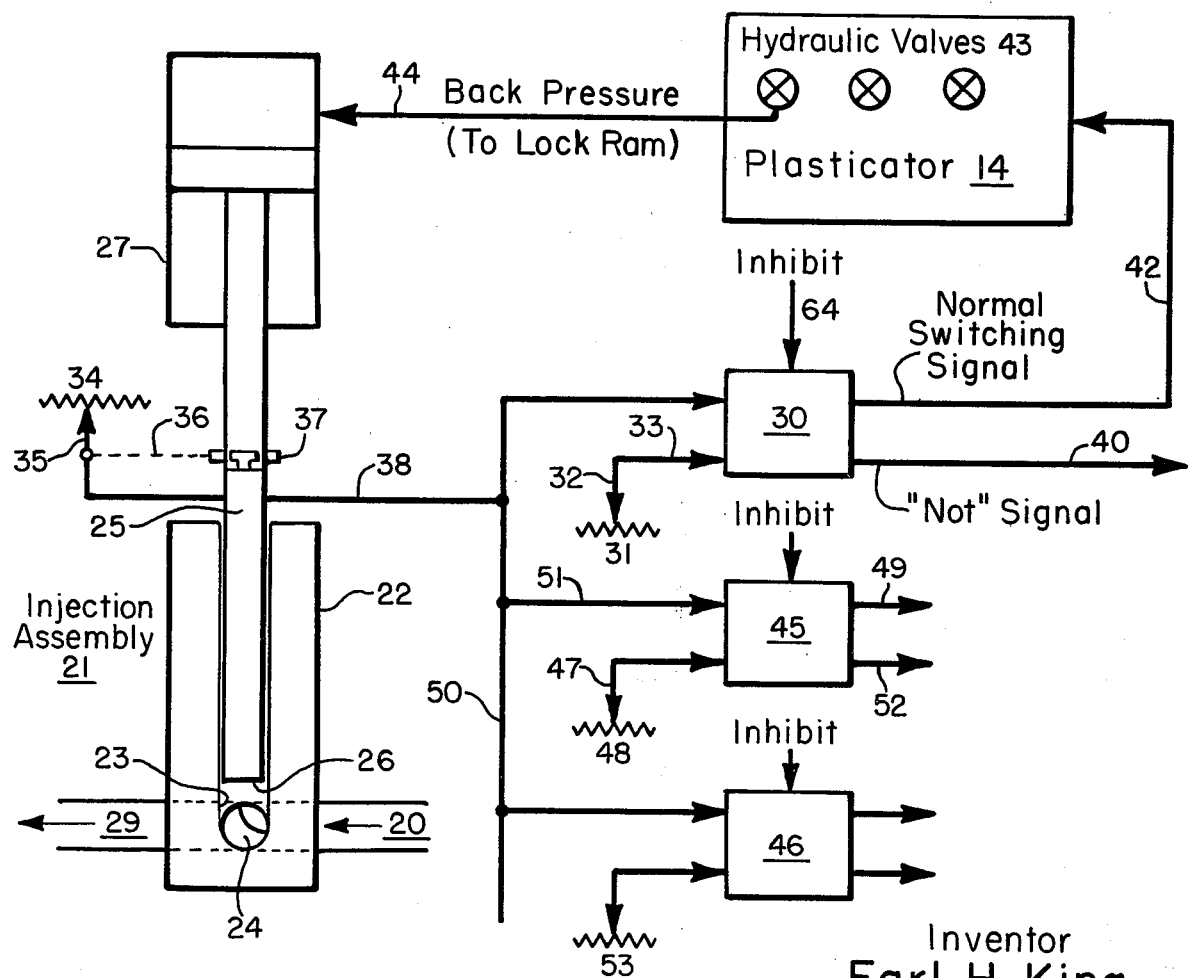
FIG. 2 is a combination illustration, including a side view of an injection assembly and a general showing of the control system of this invention.

As better shown at the left side of FIG. 2, the molten plastic is received from plasticator 14 through an input channel 20 in the lower portion of an injection assembly 21. This assembly includes a housing 22 which defines an accumulator chamber 23 in the interior, and a rotary valve 24 for connecting input channel 20 with accumulator chamber 23 and thereafter connecting chamber 23 with an output channel 29 for passing the plastic shot toward the molds. Injection assembly 21 further comprises an injection ram 25 which has a lower working surface 26. The ram can be moved upward under the regulation of injection cylinder 27 to allow the molten plastic received from input channel 20 to be stored within chamber 23 as the ram is pushed upwards. After the desired shot size is accumulated in chamber 23 beneath the working edge of the ram, rotary valve 24 is turned and injection cylinder 27 is actuated to drive the ram in the opposite direction, displacing the accumulated molten plastic through discharge channel 29 into the mold 10 then in the shooting position. The components of the injection molding machine thus far described are well known and the operation of these units are well understood in this art.

DETAILED DESCRIPTION OF THE INVENTION

Particularly in accordance with this invention, a control system 30 is provided as shown in the right portion of FIG. 2. A first adjustable unit, depicted as a potentiometer 31, is provided to preset the shot size. By presetting the position of the movable arm 32, a reference signal is provided over line 33 to the control system or module 30. This control signal indicates the desired shot size, or the amount of plastic which should be accumulated within chamber 23 to precisely fit the volume in the mold then in the shooting position. A second adjustable unit, shown as another potentiometer 34, is also provided and connected so that the position of its movable arm 35 is a function of the position of injection ram 25. This can be done, for example, by extending a mechanical connection represented by broken line 36, to a collar 37 affixed to the exterior of ram 25. Collar 37 is displaced upwardly and downwardly in conformity with the movement of the working face 26 of the injection ram. In this way the position signal translated over line 38 to the module 30 varies as a function of the position of the displaceable member or injection ram 25.

As will be explained hereinafter in connection with FIG. 3, the control system within module 30 includes a comparator means which is coupled to both the first and second adjustable units 31 and 34. The comparator operates to provide a control signal at its output side when it "recognizes," or responds to, equality between the reference signal from first potentiometer 31 and the position signal from second potentiometer 34. Until this equality is signalled by the comparator circuit, a "not" output signal is provided over line 40. Responsive to detection of this equality condition between the reference and position signals, a normal or actuating signal is passed over line 42 to the plasticator 14, to close one or more of the hydraulic valves 43 within this unit. A simple arrangement, such as a back pressure connection represented by line 44, is provided between the hydraulic valves 43 and the injection cylinder 27. With this connection, as the hydraulic valves 43 are shifted to a stop position, the cylinder 27 is locked in place and the ram 25 is prevented from moving any farther. In this way the precise amount of foamed or molten plastic is accumulated within chamber 23 for subsequent discharge through output channel 29 to the molds.

FIG. 2 also shows two additional control systems, or shot size selector modules, 45 and 46. These modules are exactly the same as the first module or control system 30, but are used for regulating the shot sizes for the next two of the molds 10 which will be successively indexed onto the table for receipt of the molten plastic. There are three additional modules, not shown in this view, for regulating the plastic injected into the three additional molds when the rotary machine includes six different mold positions, as does the machine shown in FIG. 1. An output signal from module 45 will be provided over line 49, responsive to equality between a first signal received over line 47 from the set potentiometer 48 and a second signal denoting the instantaneous position of the ram as signalled over potentiometer 34, conductors 38, 50, and 51 to the other input connection of module 45. Until this equality of the two signals is recognized, a "not" output signal is provided on output conductor 52 as already described in connection with module 30. The provision of module 46 and its shot size set potentiometer 53, and any number of additional modules, will be apparent from this description and the subsequent description of a typical module such as 30.

DETAILED DESCRIPTION OF CONTROL SYSTEM 30

Figure 3:
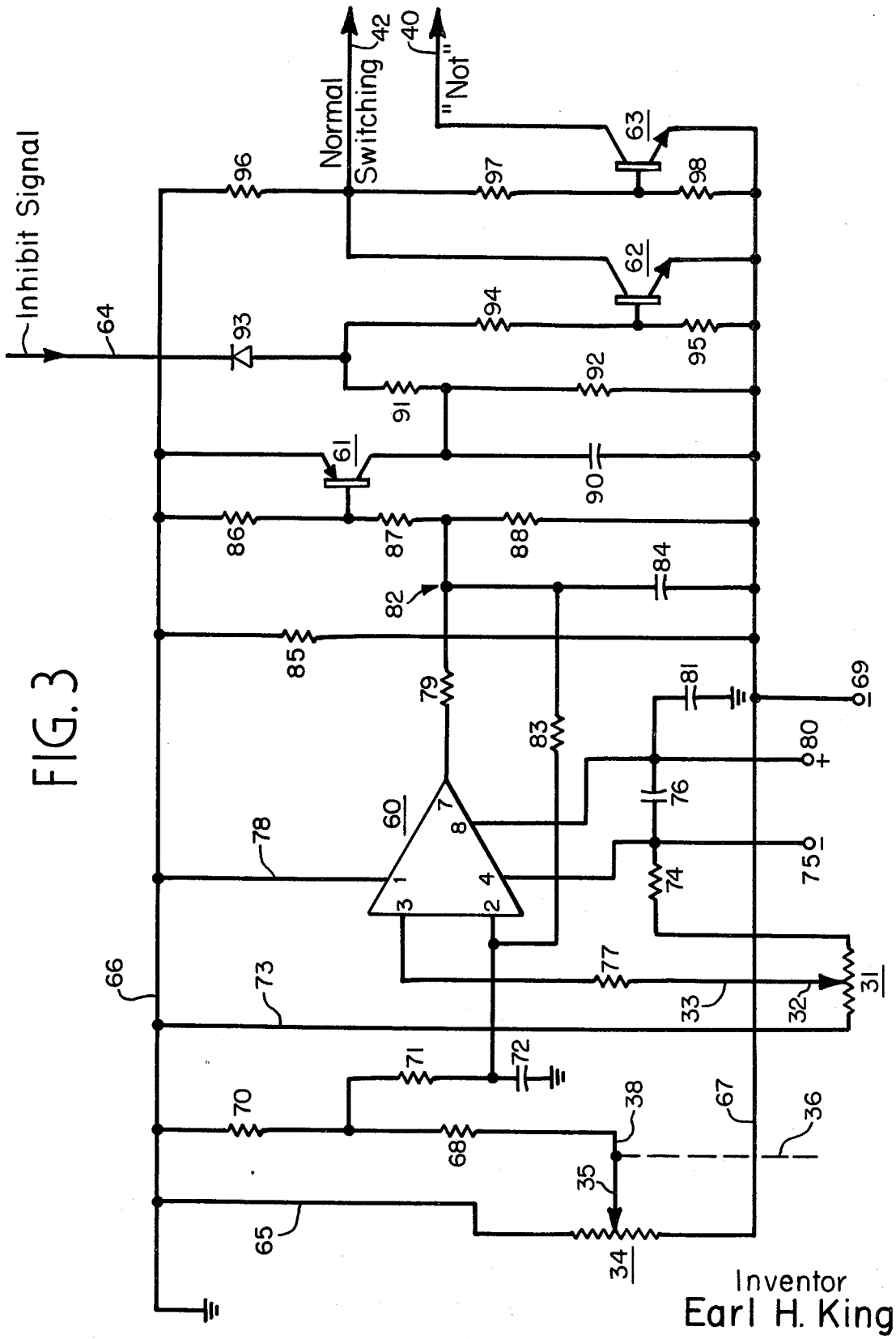
FIG. 3 is a schematic diagram depicting circuit details of the control system shown generally in FIG. 2.

FIG. 3 depicts the circuit details of a typical module or control system 30. Major components of the control system 30 include the comparator means 60, and three transistors designated 61, 62, and 63. In the circuit shown transistor 61 is a PNP type transistor, and transistors 62 and 63 are NPN types. Those skilled in this art will appreciate that other types can be substituted with the simultaneous inversion of the polarities of the energizing and operating potentials. In addition a line 64 is provided as a means for receiving an inhibit signal from associated equipment at the machine control station. This inhibit signal is applied to the modules for those molds not in the shooting position, to assure that those molds will not receive a control signal before the proper positioning of each mold.

At the left side of FIG. 3 the upper end of potentiometer 34 is coupled over a conductor 65 to a reference conductor 66, shown connected to ground. The other end of potentiometer 34 is coupled to an energizing conductor 67. Suitable operating potentials and component identifications for this perferred embodiment of the module will be given below.

Movable tap 35 of potentiometer 34 is coupled over a series circuit including conductor 38 and resistors 68 and 70 to reference conductor 66. Another resistor 71 has one end coupled to input terminal 2 of a comparator circuit 60, shown as an integrated circuit or op amp, and the other end of resistor 71 is coupled to the common connection between resistors 68, 70. A filter capacitor 72 is connected between ground and input terminal 2 of op amp 60.

Potentiometer 31, regulating the shot size selection, has its left side coupled over conductor 73 to reference conductor 66. The other side of this potentiometer is coupled over a resistor 74 to an energizing terminal 75, to connection 4 of op amp 60, and to one plate of capacitor 76. Movable tap 32 of potentiometer 31 is coupled over a series circuit including conductor 33 and resistor 77 to the other input connection, referenced 3, of comparator circuit 60. The 1 terminal of this op amp is coupled over conductor 78 to ground, and the 8 terminal is coupled both to a plus energizing terminal 80 and to the other side of plate 76. Another filter capacitor 81 is coupled between ground and the 8 connection of op amp 60.

An output resistor 79 is coupled in series between output connection 7 of op amp 60 and comparator output terminal 82. A feedback resistor 83 is coupled between input terminal 2 and the output terminal 82 of the comparator stage. A filter capacitor 84 is coupled between terminal 82 and energizing conductor 67. Resistor 85 is coupled across the main circuit conductors 66 and 67. In the preferred embodiment this particular resistor was epoxied to the case of the integrated circuit 60, for temperature stabilization.

Output terminal 82 of the comparator stage 60 is coupled to the common connection between resistors 87 and 88. Transistor 61, which can be considered as switching means for passing the control signal from terminal 82 to the associated equipment for regulating the shot size, has its base coupled to the common connection between resistors 86 and 87, and its emitter connected directly to conductor 66. The collector of transistor 61 is coupled over a capacitor 90 to the other main conductor 67, and the collector is also coupled to the common connection between a pair of series-coupled resistors 91, 92. A diode 93 is connected between the inhibit conductor 64 and the top of resistor 91, and another series circuit including resistors 94 and 95 is coupled in parallel with the adjacent circuit 91, 92. The base of transistor 62 is coupled to the common connection between resistors 94 and 95, and its emitter is coupled to conductor 67. The collector of this transistor is coupled to the normal output conductor 42, and is also connected to the common connection between resistors 96 and 97 in another voltage divider arrangement which also includes resistor 98. The base of transistor 63 is coupled to the common connection between resistors 97 and 98, its emitter is connected directly to conductor 67. The collector of transistor 63 is coupled to the "not" output conductor 40.

In operation, before the mold to be regulated by module 30 is positioned on the table, the movable tap of potentiometer 31 is adjusted to indicate the shot size to be injected into that mold. At this time an inhibit signal is received over conductor 64, insuring that transistor 62 is maintained nonconducting. Under these conditions the base-emitter junction of transistor 63 is forward biased, and a negative polarity "not" signal is passed over output conductor 40 to the control system. This system can be that which normally regulates the valves just beneath the manifold, determining whether the plastic can be passed into the mold then on the table. These valves and their control is well known and understood in this art. The system is then conditioned for operation as the associated mold is placed on the table, by removing the inhibit signal from conductor 64.

Referring to FIG. 2, as the molten plastic is received under pressure from the plasticator 14 through input conduit 20, rotary valve 24 is in the position indicated, and ram 25 is displaced upwardly as the molten plastic enters chamber 23. As the ram or movable member is displaced, its collar 37 adjusts movable tap 35 of the second adjustable unit 34 from its initial position, to provide a position signal from this potentiometer which varies as a function of the ram displacement. This position signal is passed over line 38, as shown at the left side of FIG. 3, and over resistors 68, 71 to the 2 input connection of comparator stage 60. At the same time the other input terminal 3 is receiving the reference signal, signifying the desired shot size, as preset on the first adjustable unit 31. When the two input signals are equal, op amp 60 rapidly switches and provides a negative-going control signal at output terminal 82. This negative-going signal is applied to the base of transistor 61, which for purposes of this explanation can be considered the switching means. Those skilled in the art will appreciate that the term "switching means" can also include transistor 62, the electrical output connections, and the back pressure hydraulic connection between plasticizer 14 and the injection cylinder 27. However the precise arrangement for translating the control signal at terminal 82 to halt movement of ram 25 is not important to the underlying concept and structure of the invention, that of precisely regulating the shot size or volume of plastic accumulated within chamber 23.

As transistor 61 is rapidly driven on, a positive-going signal is provided at its collector, and this signal is in turn passed over resistors 91 and 94 to rapidly drive transistor 62 into saturation. As transistor 62 is driven on the potential between resistors 96 and 97 rapidly goes negative, providing the normal output switching signal on conductor 42 for shifting the hydraulic valves 43 in the plasticizer to a stop position. At this time the back pressure signal is passed over line 44, as represented generally in FIG. 2, to halt movement of ram 25. Thus the precise amount of molten plastic is held ready within the accumulator chamber 23 for injection by the next movement of cylinder 27. By shifting the valves in the plasticizer at the same time the ram is stopped, the control system of this invention enables the machine to automatically plasticize and shoot a predetermined shot into a first mold, and immediately prepare and inject a differently sized shot into the next mold after it is indexed into position.

It is noted that as the switching transistsor 62 is driven on, the negative-going signal appearing on output conductor 42 is also applied over resistor 97 to the base of transistor 63, turning this transistor off and removing the "not" signal from line 40. Thus the valves in the assembly just below the manifold will be free to operate and allow the molten plastic to pass into the mold with the downward movement of injection ram 25.

To assist those skilled in the art to practice the invention with a minimum of experimentation, the various components shown in FIG. 3 are identified in the table set out below. Comparator circuit 60 was a Fairchild type 710C integrated circuit, but of course other types of integrated circuits, and in fact other circuit arrangements, can be utilized to provide a control signal at point 82 responsive to equality between the two input signals. The circuit was energized with a negative 24 volt potential applied to terminal 69, a negative 6 volt potential applied to terminal 75, and a positive 12 volt potential applied to terminal 80. Potentiometers 31 and 34 were of the ten-turn type, with a resistance scale of 1 K to 10 K. These two components were rated at 2 watts, and in temperature compensation resistor 85 was rated at ½ watt. All the other resistors were conventional ¼ watt units. The values of the remaining components are given below:

| Component | Value or Identification |
|---|---|
| 61 | 2N4125 |
| 62,63 | 2N4123 |
| 93 | B5 |
| 72,81,84,90 | 0.01 µfd. |
| 76 | 0.56 µfd. |
| 68 | 100 K |
| 70,88 | 18 K |
| 71,77 | 200 |
| 74 | 3.9 K |
| 79,86 | 2.2 K |
| 83 | 510 K |
| 85 | 1.5 K |
| 87,92,95 | 3.3 K |
| 91,96 | 27 K |
| 94 | 10 K |
| 97 | 39 K |
| 98 | 5.6 K |

It is understood that these values and component identifications are given solely to assist those skilled in the art to practice the invention with minimum experimentation. In no sense are the values to be considered a limitation on the inventive concept or structure.

SUMMARY

When incorporated with a rotary injection molding machine, the control system of this invention enables the machine operator to set the exact amount of structural foam plastic to be plasticized and accumulated in the injection accumulator chamber. This can be done from a remote position, and the shot in the chamber can thus be regulated to match exactly the mold capacity as the particular mold comes around the track and is indexed at the shooting position. The subsequent shots for the successive molds can be of varying sizes, and they are still accurately and individually measured before injection into the mold. The provision of a "not" output signal until the exact volume of plastic is accumulated insures that the plastic is not injected into the mold prematurely. Use of an inhibit signal also insures that no control system will be activated for its corresponding mold until that mold has been moved into the shooting position. This can be regulated from the same switches that control the table and mold positions.

While only a particular embodiment of the invention has been described and illustrated, it is manifest that various modifications and alterations may be made therein. It is therefore the intention in the appended claims to cover all such modifications and alterations as may fall within the true spirit and scope of the invention.

What is claimed is:

1. A rotary injection molding machine including a plasticator unit, a plurality of molds for displacement along a path into a work position adjacent the plasticator, an injection assembly including an accumulator chamber, a reciprocable member positioned at least partially in the chamber, means for regulating movement of said member within the accumulator chamber, a valve effective in a first position to complete a passage between the accumulator chamber and an input channel through which molten plastic is received from the plasticator, and effective in a second position to complete a passage between the accumulator chamber and output channel for discharging the accumulated plastic toward the mold, and first and second control systems for regulating the amount of plastic accumulated and discharged into first and second molds by regulating displacement of said member; said first control system comprising:
   a comparator circuit having first and second input connections and an output connection for providing a control signal responsive to equality between signals received at the input connections,
   a first potentiometer coupled to a first input connection of the comparator circuit for presetting a reference signal indicating the desired quantity of plastic to be accumulated and discharged to the first mold,
   a second potentiometer electrically coupled to the second input connection of the comparator circuit and mechanically coupled for operation as a function of displacement of said member to provide a position signal that varies as a function of the position of the member, and
   switching means connected for operation by the control signal to terminal displacement of said member when the desired quantity of plastic material is present in the accumulator chamber;
and said second control system comprising:
   a comparator circuit having first and second input connections and an output connection for providing a control signal responsive to equality between signals received at the input connections,
   a first potentiometer coupled to a first input connection of the comparator circuit for presetting a reference signal indicating the desired quantity of plastic to be accumulated and discharged to the second mold,
   means for coupling the second input connection of the comparator circuit to said second potentiometer which provides the position signal as a function of the displacement of said member; and
   switching means connected for operation by the last-mentioned control signal to terminate displacement of said member when the desired quantity of plastic material for the second mold is present in the accumulator chamber.

2. A rotary injection molding machine as claimed in claim 1, in which each of the control systems further includes a signal inversion stage for providing a "not" output signal to prevent injection into the associated mold until the comparator circuit of the given control system recognizes equality between the reference and position signals, thus indicating the desired quantity of plastic material has been accumulated for the mold then in the work position.

3. A rotary injection molding machine including a plasticator unit, a plurality of molds for displacement along a path into a work position adjacent the plasticator, an injection assembly including an accumulator chamber, a reciprocable member positioned at least partially in the chamber, means for regulating movement of said member within the accumulator chamber, a valve effective in a first position to complete a passage between the accumulator chamber and an input channel through which molten plastic is received from the plasticator, and effective in a second position to complete a passage between the accumulator chamber and an output channel for discharging the accumulated plastic toward the mold, and first and second control systems for regulating the amount of plastic accumulated and discharged into first and second molds by regulating displacement of said member; said first control system comprising
   a comparator circuit having first and second input connections and an output connection for providing a control signal responsive to a predetermined relationship between signals received at the input connections,
   a first potentiometer coupled to a first input connection of the comparator circuit for presetting a reference signal indicating the desired quantity of plastic to be accumulated and discharged to the first mold,
   a second potentiometer electrically coupled to the second input connection of the comparator circuit and mechanically coupled for operation as a function of displacement of said member to provide a position signal that varies as a function of the position of the member; and
   switching means connected for operation by the control signal to terminate displacement of said member when the desired quantity of plastic material is present in the accumulator chamber;
and said second control system comprising:
   a comparator circuit having first and second input connections and an output connection for providing a control signal responsive to a predetermined relationship between signals received at the input connections,
   a first potentiometer coupled to a first input connection of the comparator circuit for presetting a reference signal indicating the desired quantity of plastic to be accumulated and discharged to the second mold,
   means for coupling the second input connection of the comparator circuit to said second potentiometer which provides the position signal as a function of the displacement of said member; and switching means connected for operation by the last-mentioned control signal to terminate displacement of said member when the desired quantity of plastic material for the second mold is present in the accumulator chamber.

4. An injection molding machine for injecting different controlled quantities of plastic material into molds of different capacities, comprising a plasticator, an accumulation chamber, a member in the accumulation chamber displaceable in a first direction to accumulate a volume of plastic material and in a second direction to inject the accumulated volume to a mold, means defining a path for the movement of said molds, means adjacent said path defining an injection station at which said accumulated volume of plastic material is injected into a mold, and control means for varying the volume of the plastic material accumulated in said chamber for different capacity molds, said control means including a plurality of control systems one for each of a plurality of different volumes of material to be accumulated in said chamber for injection into molds of different capacities, each said control system comprising:

a comparator circuit, having first and second input connections and an output connection for providing a control signal responsive to equality between signals received at the input connections;

a first potentiometer, coupled to a first input connection of the comparator circuit, for presetting a reference signal indicating the desired quantity of plastic to be accumulated and discharged to a mold;

a second potentiometer, electrically coupled to the second input connection of the comparator circuit, and mechanically coupled for operation as a function of displacement of said member, to provide a position signal which varies as a function of the position of the member; and switching means connected for operation by the control signal to terminate displacement of said member when the desired quantity of plastic material is present in the accumulator chamber, whereby said first potentiometer of each control system can be preset to establish different reference signals to vary the amount of material injected into different molds.

5. An injection molding machine as claimed in claim 4, in which said switching means includes at least one amplifier circuit for providing a normal output signal at a first output terminal upon receipt of said control signal to halt displacement of said member.

6. An injection molding machine as claimed in claim 5, and further comprising a signal inversion stage, coupled to the first output terminal for providing a "not" output signal at a second terminal until there is equality between the reference signal and position signal.

7. An injection molding machine as claimed in claim 4, and further comprising means for applying an inhibit signal to the switching means, to prevent operation of the control system associated with a given mold until that mold is moved into the work position adjacent the plasticator unit.

8. An injection molding machine for injecting different controlled quantities of plastic material into molds of different capacities, comprising a plasticator, an accumulation chamber, a member in the accumulation chamber displaceable in a first direction to accumulate a volume of plastic material and in a second direction to inject the accumulated volume to a path for the movement of said molds, means adjacent said path defining an injection station at which said accumulated volume of plastic material is injected into a mold, and control means for varying the volume of the plastic material accumulated in said chamber for different capacity molds, said control means including a plurality of control systems one for each of a plurality of different volumes of material to be accumulated in said chamber for injection into molds of different capacities, each said control system comprising:

a comparator circuit, having first and second input connections and an output connection for providing a control signal responsive to a predetermined relationship between signals received at the input connections;

a first potentiometer, coupled to a first input connection of the comparator circuit, for presetting a reference signal indicating the desired quantity of plastsic to be accumulated and discharged to a mold;

a second potentiometer, electrically coupled to the second input connection of the comparator circuit, and mechanically coupled for operation as a function of displacement of said member, to provide a position signal which varies as a function of the position of the member; and switching means connected for operation by the control signal to terminate displacement of said member when the desired quantity of plastic material is present in the accumulator chamber, whereby said first potentiometer of each control system can be preset to establish different reference signals to vary the amount of material injected into different molds.

9. Apparatus as set forth in claim 3 wherein said plasticator unit includes means operable to separately prepare one after the other first and second quantities of plastic material of different predetermined amounts for transfer to and accumulation in said chamber and successive injection into said first and second molds, respectively.

10. Apparatus as set forth in claim 8 wherein said plasticator includes means operable to separately prepare one after the other volumes of plastic material of different predetermined quantities for injection into molds of differerent capacities.

* * * * *